United States Patent

[11] 3,590,289

[72] Inventor Fritz Ostwald
 Buchschlag, Germany
[21] Appl. No. 831,421
[22] Filed June 9, 1969
[45] Patented June 29, 1971
[73] Assignee International Telephone and Telegraph Corporation
 New York, N.Y.
[32] Priority June 11, 1968
[33] Germany
[31] P 17 73 606.0

[54] ANGULAR ACCELERATION SENSOR WITH PIEZOELECTRIC ELEMENT
 4 Claims, 3 Drawing Figs.
[52] U.S. Cl.................................................. 310/8.4,
 73/517, 310/8.7
[51] Int. Cl...................................................... H01v 7/00
[50] Field of Search............................................ 310/8.1,
 8.5, 8.6, 8.2, 8.7, 8.4, 9.5, 9.6, 68.5, 68.4, 73;
 73/512, 493, 535, 517; 336/30

[56] References Cited
 UNITED STATES PATENTS
 3,071,975  1/1963  Hurt............................ 73/517
 2,638,556  5/1953  Hausz.......................... 310/8.4
 3,307,054  2/1967  Shoor........................... 310/8.4
 3,109,908  11/1963  Clason......................... 200/83
 1,955,111  4/1934  Buckler........................ 310/68.5
Primary Examiner—Milton O. Hirshfield
Assistant Examiner—B. A. Reynolds
Attorneys—C. Cornell Remsen, Jr., Walter J. Baum, Paul W. Hemminger, Percy P. Lantzy and Thomas E. Kristofferson ABSTRACT: A rotary accelerometer using a piezoxide (prepolarized ceramic piezoelectric element). A shaft drives a rotating mass in the form of a cylindrical sleeve through a resilient connection in one embodiment. During angular deceleration, the rotating mass tends to lead because of inertia and the resulting force is applied to a cam device which converts that force into a compressive stress applied to the piezoxide to generate a voltage analog of deceleration. In another embodiment a block mass is attached to a piezoxide block directly, so that inertial forces during deceleration are directly applied to the piezoxide. The combination is then mounted so as to respond to tangential forces about a decelerating shaft.

INVENTOR
FRITZ OSTWALD
BY
William F. O'Neil
AGENT

ANGULAR ACCELERATION SENSOR WITH PIEZOELECTRIC ELEMENT

CROSS REFERENCE TO RELATED APPLICATIONS

This application is filed under the provisions of 35 U.S.C. 119 with claim for the benefit of the filing of an application covering the same invention filed June 11, 1968, Ser. No. P 1773606.0 of the Federal Republic of Germany.

BACKGROUND OF THE INVENTION

1. Field of the Invention

The invention relates to angular acceleration sensors, with particular emphasis on angular deceleration such as experienced at a vehicle wheel during braking.

2. Description of the Prior Art

In the prior art, various devices and concepts have been employed for angular acceleration measurement.

One of these devices employs a tachometer generator to produce an angular velocity analog followed by a differentiating circuit to provide a derivative signal which is the analog of acceleration. In automotive use, which is the area of most particular concern in connection with the present invention, any such device must be rugged and must not require frequent maintenance or replacement. Also, such a device should preferably not consume significant operating power, particularly in the quiescent condition. The aforementioned tachometer generator and differentiator are somewhat less than an ideal structure, measured by those criteria.

Another prior art approach to angular acceleration determination involves the use of a strain gage arrangement and the inertial properties of a resiliently driven mass. When the input shaft is decelerated, the said mass operates on a cam to transmit an inertial force to the strain gage assembly. This arrangement is described in the present inventor's application No. T 34890 I Xb/42 0, filed Sept. 26, 1967, in the Federal Republic of Germany and in the corresponding U.S. application entitled "Accelerometer," Ser. No. 758,022, filed Sept. 6, 1968.

While this latter device is suitably rugged for automotive use, it depends on a relatively small resistance variation in the strain gage element which must be converted to a relatively large voltage change. Subsequent amplification for effecting the generation of a signal of suitable amplitude to operate an electric solenoid valve or other similar device as may be used in a braking system, is relatively complex and expensive. Moreover, the result is introduction of another element to be dealt with in the overall reliability picture.

SUMMARY

In consideration of the prior art situation, it was the general objective of the present invention to construct an angular acceleration sensor or transducer which is relatively inexpensive, is mechanically rugged and reliable, and has a high signal output so that the associated control instrumentation may be relatively simple.

The present invention makes use of the inertial force of a resiliently connected rotating mass element which is adapted to exert an inertial force on a piezoxide element employed as an analog compressive force transducer.

A relatively new family of ceramic materials is available for this purpose. These materials are prepolarized at high temperatures during the manufacturing process and are thus made artificially piezoelectric. They are both inexpensive and rugged. Moreover, they do not require a source of dissipative power for their operation. A variety of these ceramic materials is available for producing relatively large output voltages per unit of applied compression force.

In one embodiment, the inertial mass element is a rotatable sleeve coaxial with the driving shaft. This inertial mass is driven through a cam mechanism from the shaft. The cam mechanism illustrated is one which relies on the twisting of a cylindrical cage which is anchored at one end face to the driving shaft and linked to the inertial mass on the other (free) end face. The tendency of the inertial mass to continue rotating at its established angular velocity causes it to exert a torque tending to cause it to "lead" the driven shaft during deceleration thereof. That torque causes the cage to tend to elongate axially, since its sidewalls are slotted at an axial angle or are similar in shape to helical gear teeth. The cage will be understood to be sufficiently resilient to elongate if twisted by a torque applied at the free end face in a direction such as to cause the said slots to straighten or become more nearly parallel to the said axis. The axial force thus generated is applied directly as the aforementioned compressive force to the piezoelectric (piezoxide) element, resulting in the generation of a voltage signal which is the analog of deceleration. The cam action of the cage will be understood to provide some mechanical advantage for increasing the scale factor of the said analog signal.

Another embodiment places the piezoxide block on a disc, the plane of which is normal to the shaft. A block inertial mass is affixed substantially only to one face of the piezoxide so that it exerts compressive force by tangential inertial effect during deceleration. This embodiment requires slip rings, since the piezoxide and its electrical terminals rotate around the shaft.

A detailed description referenced to the drawings is hereinafter provided.

BRIEF DESCRIPTION OF THE DRAWINGS

Referring now to FIG. 1, the showing of an axial sectional view of a typical structure is not necessarily to scale. A housing of generally circular cross section is comprised of part 1 with the end plate 2 attached during assembly operation such as by means of screws 3. The shaft 4 is assumed to be normally driven in the direction of the arrow and may be accelerated or decelerated. A fly wheel section 12 may be integral with the shaft 4. A bearing 6 with its inner and outer races 7 and 8 respectively, and also a bearing 9 with its inner and outer races 10 and 11 respectively, firmly support the shaft 4 and its fly wheel section 12 with rotational freedom.

A collar 5 provides axial constraint against the inner bearing race 7 and the bearings 6 and 9 are to be understood to be capable of resisting moderate thrust normally experienced in the operation of the device.

Figure 1:
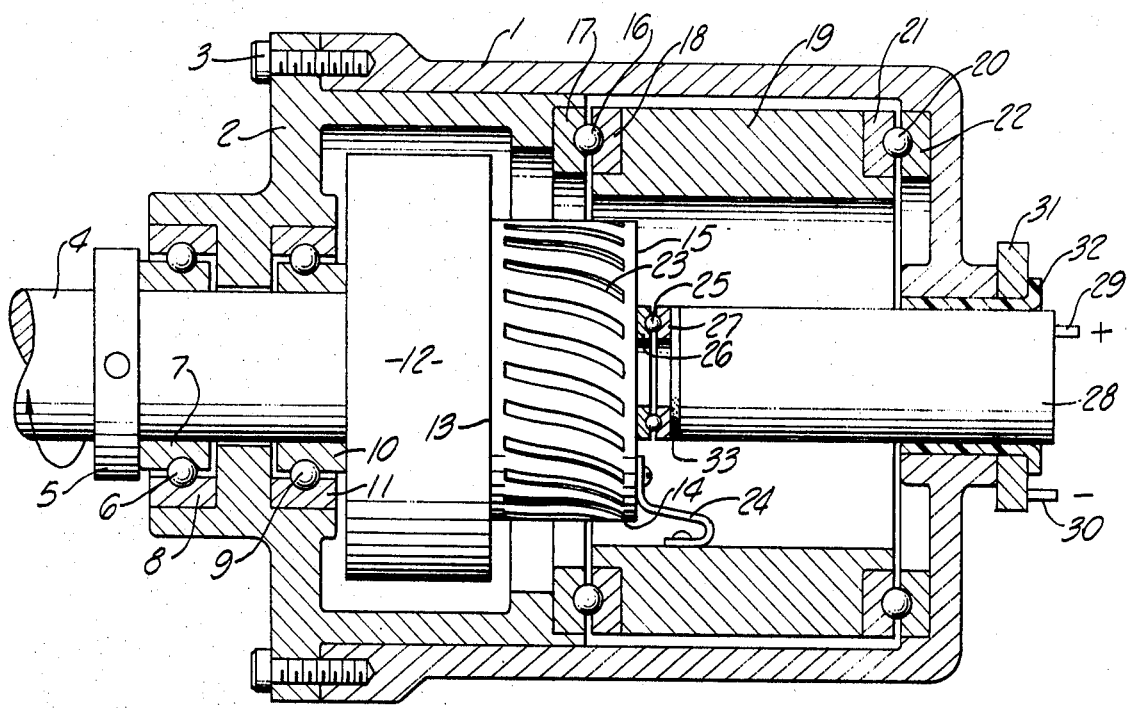
FIG. 1 herewith, is an axial section showing a typical structure of a first embodiment of the invention with rotational mass and stationary piezoelectric transducer element.

An annular rotational mass 19 is axially constrained, but is allowed full rotational freedom about the axis of the shaft 4 through the support provided by bearings 16 with its races 17 and 18 and bearing 20 with its races 21 and 22. A piezoelectric transducer element 28 in a substantially cylindrical shape is arranged to be tightly fit in the right end of housing (as depicted in FIG. 1). A bushing of insulated material 32 serves to electrically isolate transducer element 28 from the metallic housing 1 and metallic end flange 31. The fit provided among 28, 31, 32 and the housing 1 is such that 28 is not allowed axial freedom even when substantial compression force is applied to it during operation. The element 28 is preferably an artificially piezoelectric ceramic (piezoxide). A class of such ceramics has been extant for a decade or more, and their utilization as pressure sensors (transducers) is known. Among the possibilities for the material of the element 28, are ceramics suitable processed of barium or lead-zirconate titanate.

The reader can inform himself fully of the criteria for selecting a suitable piezoxide ceramic for a particular application or variation from prior art printed material. The trade periodical "Electro Technology (a Conover-Mast Publication), provides a review and much engineering information in its May 1966 issue. Also, a paper entitled "Recent Developments in Ferroelectric Ceramics," published in the IRE Transactions on Ultrasonic Engineering, Vol. UE–4, Pages 53—65, (AUG. 1965) provides additional background information on these materials and selection of particular piezoxides for purposes related to the function of the element 28 in the structure of the present invention.

Referring again to FIG. 1 it will be noted that a cam drive 14 is rigidly attached along one of its cylindrical end faces to the element 12. Along the other face 15, this cam device, which is actually in the nature of a thin wall cage of resilient metal, is located such that it is capable of transmitting axial compression force on 28 through bearing 25 and its races 26 and 27 and through the metallic shoe plate 33. It will be noted that the cage 14 has its perimeter wall slotted (as typically at 23). These slots are at an angle with respect to the parallels of the shaft 4 and may actually be spiraled or helical.

Figure 2:
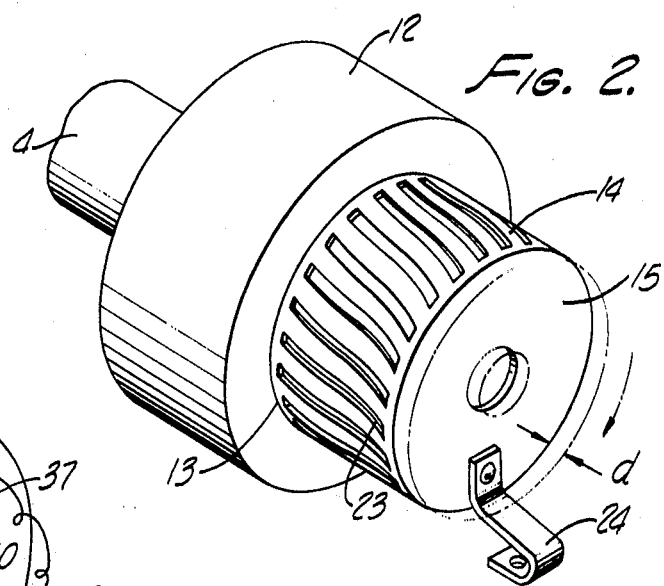
FIG. 2 is a perspective of the shaft drive and cam device of FIG. 1.

In order to understand the nature of the structure and its function, it is best to simultaneously consider the detail of FIG. 2 and discuss the operation of the device along with the structural description. The numbering of parts from FIG. 2 will be recognized as consistent with FIG. 1.

Assuming now that the shaft 4 is rotating at constant speed in the direction of the arrow on FIG. 1, it will be apparent that fly wheel 12 in the cage 14 is rotating at this same angular velocity. The inertial rotating mass 19 is also rotating at this same angular velocity by virtue of its connection 24 to the cam device (cage) 14.

Let it be assumed that the shaft 4 is now decelerated. Since the connection 24 and the cage 14 afford what amounts to a resilient mechanical coupling between the shaft 4 and the inertial mass 19, the said mass 19 will tend to continue rotating at the angular velocity acquired prior to deceleration of the shaft 4. The result is that the mass 19 will tend to lead by some comparatively small angle, thereby twisting the end face 15 of the cage 14 with respect to its solidly mounted end face 13. The effect will be for the slots 23 to tend to straighten out and become more nearly parallel to the axis of shaft 4. This twisting action tends to elongate the cage 14 axially and this elongation is depicted in an exaggerated amount at "$d$" on FIG. 2.

The bearing 25 and its races, together with the shoe place 33 bring the cage into mechanical contact with the piezoxide 28, even for very small decelerations; therefore, the effect of larger decelerations is to increase the compression force thus applied against 28.

From the known characteristics of piezoxide material, a voltage signal will be developed across the end faces of 28, and is available between the terminals 29 and 30. The terminal 30 connecting path passes through the housing 1 and the intervening conductive parts, bearings and the cage 14, up to the metallic shoe plate 33.

Since the piezoxide is not fundamentally a current source, the said voltage signal from 28 must thereafter be handled by high input impedance amplifiers, controlled valves, etc., such as would be included for the control of an automotive braking system, an example of an application to which the present invention is particularly applicable.

The prior patent application hereinbefore identified discloses a variation in the mechanical details for converting the shaft deceleration to a compression force and that structure will be understood to be adapted to providing the compression force at 33 in the present invention.

Figure 3:
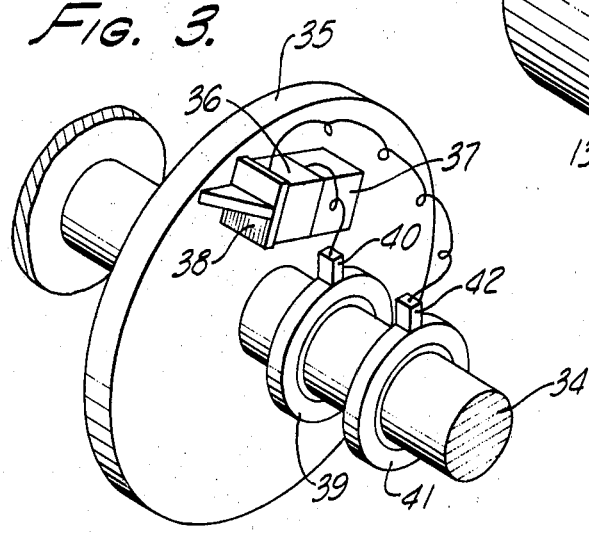
FIG. 3 is a perspective of a second embodiment of the invention with rotating transducer and associated inertial mass.

Referring now to FIG. 3, a variation in the structure employing the basic concept of the present invention in respect to use of a piezoxide transducer in a combination for angular acceleration measurement is shown. Here a shaft 34 remains stationary and a disc 35 is driven (by means not illustrated) to rotate about it.

A piezoxide block 36 is affixed to a metallic conductive gusseted plate 38 and thence to the disc 35. A block mass 36 is supported substantially only by its adherence to the piezoxide block 36. Thus the block 37 is able to exert a compression force on 36 in a tangential direction when the disc 35 is decelerated, and thereby produce the desired voltage signal analog of deceleration, assuming that its direction of rotation is counterclockwise as observed facing FIG. 3. Obviously sliprings 39 and 41 with their respective brushes 40 and 42 are required, since there is relative motion between 34 and 35. These slip-rings and brushes are entirely conventional per se.

Other variations falling within the concept of the present invention will suggest themselves to those skilled in the art. The drawings and description herein are illustrative and by way of example only.

I claim:

1. A device for generating a signal which is the analog of angular deceleration of a shaft, comprising:
   a piezoelectric transducer for generating an electrical signal which is a function of applied compressive force;
   means including a mass and drive means for causing rotation of said mass around the axis of said shaft, said drive means comprising a resilient connection between said shaft and said mass whereby said mass tends to lead said shaft by an angle which is a function of the magnitude of said deceleration; and
   inertial force coupling means for causing said mass to exert a compressive force on said transducer when said shaft is angularly decelerated, thereby generating a signal as a function of angular deceleration of said shaft, said inertial force coupling means including cam means adapted to apply said compressive force as a function of said lead angle.

2. The invention set forth in claim 1 in which said cam means comprises a thin walled cylindrical cage having a plurality of slots running at an angle with respect to shaft parallels, one end face of said cylindrical cage being firmly and coaxially connected to said shaft and the second end face being positioned substantially against one face of said transducer;
   and means including said resilient connection are included, whereby said second end face tends to extend axially in response to twisting of said cage to apply said compressive force when said mass tends to lead said shaft.

3. A device for generating a signal which is the analog of angular acceleration comprising:
   a rotatable shaft, the angular acceleration of which is to be measured;
   a stationary piezoelectric transducer for generating an electrical signal which is a function of the compressive force applied to the transducer; and
   an inert mass coupled to the shaft for rotation therewith by a torque transmitting coupling, the coupling having means for applying a force to the transducer which is proportional to the torque transmitted and independent of the angular velocity of the shaft.

4. A device for generating a signal which is the analog of angular acceleration as defined in claim 3, wherein the coupling is a torsional member, the axial length of which varies as a function of the torque transmitted and the end of the torsional member abuts against the transducer whereby an electrical signal will be generated in the transducer in proportion to the torque transmitted through the coupling.